(12) United States Patent
Applegate et al.

(10) Patent No.: US 7,413,654 B2
(45) Date of Patent: *Aug. 19, 2008

(54) WASTEWATER TREATMENT CONTROL

(75) Inventors: Charles Stark Applegate, Brookfield, WI (US); David W. Dubey, Mukwonago, WI (US)

(73) Assignee: Siemens Water Technologies Holding Corp., Warrendale, PA (US)

( * ) Notice: Subject to any disclaimer, the term of this patent is extended or adjusted under 35 U.S.C. 154(b) by 160 days.

This patent is subject to a terminal disclaimer.

(21) Appl. No.: 11/302,707

(22) Filed: Dec. 13, 2005

(65) Prior Publication Data

US 2006/0113243 A1 Jun. 1, 2006

Related U.S. Application Data

(63) Continuation-in-part of application No. 10/745,446, filed on Dec. 23, 2003, now Pat. No. 7,208,090.

(51) Int. Cl.
C02F 3/30 (2006.01)

(52) U.S. Cl. .................... 210/605; 210/614; 210/630

(58) Field of Classification Search .............. 210/605, 210/614, 630, 631, 903, 906, 908
See application file for complete search history.

(56) References Cited

U.S. PATENT DOCUMENTS

| | | | |
|---|---|---|---|
| 4,277,342 A | 7/1981 | Hayes et al. | |
| 4,370,233 A | 1/1983 | Hayes et al. | |
| 4,548,715 A * | 10/1985 | Stein ........................ | 210/614 |
| 4,961,854 A | 10/1990 | Wittmann et al. | |
| 4,975,197 A | 12/1990 | Wittmann et al. | |
| 5,051,191 A | 9/1991 | Rasmussen et al. | |
| 5,098,567 A | 3/1992 | Nishiguchi | |
| 5,114,587 A | 5/1992 | Hägerstedt | |
| 5,288,406 A | 2/1994 | Stein | |
| 5,348,653 A | 9/1994 | Rovel | |
| 5,376,242 A | 12/1994 | Hayakawa | |
| 5,482,630 A | 1/1996 | Lee et al. | |
| 5,582,734 A | 12/1996 | Coleman et al. | |
| 5,624,565 A | 4/1997 | Lefevre et al. | |

(Continued)

FOREIGN PATENT DOCUMENTS

JP 60-84199 5/1985

(Continued)

OTHER PUBLICATIONS

Charpentier, et al., ORP Regulation and Activated Sludge, 15 years of Experience, 19th Biennial Conference/AWQ of Vancouver—Jun. 1998.

(Continued)

*Primary Examiner*—Fred Prince

(57) ABSTRACT

A wastewater treatment method. The method includes establishing a setpoint value of oxidation-reduction potential of a mixed liquor, measuring a measured value of oxidation-reduction potential of the mixed liquor, comparing the measured value of oxidation-reduction potential and the setpoint value of oxidation-reduction potential, generating a control signal based at least in part on the step of comparing, controlling operation of an aeration device using the control signal, acquiring at least one value corresponding to the control signal and adjusting the setpoint value of oxidation-reduction potential using the at least one value. The value includes a frequency of operation of the aeration device.

15 Claims, 5 Drawing Sheets

U.S. PATENT DOCUMENTS

| | | | |
|---|---|---|---|
| 5,733,456 | A | 3/1998 | Okey et al. |
| 5,818,412 | A | 10/1998 | Maekawa |
| 5,989,428 | A | 11/1999 | Goronszy |
| 6,036,862 | A | 3/2000 | Stover |
| 6,066,256 | A | 5/2000 | Henry et al. |
| 6,093,322 | A * | 7/2000 | Bongards .................... 210/614 |
| 6,454,949 | B1 | 9/2002 | Sesay et al. |
| 6,527,956 | B1 | 3/2003 | Lefevre et al. |
| 6,783,679 | B1 * | 8/2004 | Rozich ....................... 210/614 |
| 7,208,090 | B2 * | 4/2007 | Applegate et al. .......... 210/605 |

FOREIGN PATENT DOCUMENTS

| | | |
|---|---|---|
| JP | P2000-199086 | 7/2000 |

OTHER PUBLICATIONS

Klopping et al., Activated Sludge Microbiology, Filamentous and Non-Filamentous Microbiological Problems and Biological Nutrient Removal; Water Environment Federation, Plant Operations Specialty Conference, date unknown.

Caulet, et al., Modulated Aeration Management by Combined ORP and DO Control, Center of International Research for Water Environment, France, 1999.

Chudoba, et al, Pre-Denitrification Performance of a High-Loaded Anoxic Sludge, Degremont Research Center, France, 1999.

Biological Nutrient Removal with an Internal Organic Carbon Source in Piggery Wastewater Treatment, Water Research, vol. 34 No. 3, pp. 965-973, 2000.

Kim, et al., pH and Oxidation-Reduction Potential Control Strategy for Optimization of Nitrogen Removal in an Alternating Aerobic-Anoxic System, Water Environment Research, vol. 73, No. 1, 2001.

* cited by examiner

WASTEWATER TREATMENT CONTROL

RELATED APPLICATIONS

The present application is a continuation-in-part of prior filed U.S. patent application Ser. No. 10/745,446, filed on Dec. 23, 2003, now U.S. Pat. No. 7,208,090, the entire contents of which is hereby incorporated by reference.

FIELD OF THE INVENTION

The invention relates to wastewater treatment control and, more particularly, to reduction of solids generated from wastewater treatment.

BACKGROUND OF THE INVENTION

Many wastewater treatment facilities utilize an activated sludge wastewater treatment process to treat domestic and industrial wastewater. Wastewater containing organic compounds, nitrogen compounds, and/or phosphorus compounds is introduced into one tank or a series of tanks in the presence of biologically active microoogranisms, or biomass, to form a mixed liquor. Reductions in organic compounds, nitrogen compounds, and/or phosphorus compounds are achieved by maintaining specific environmental conditions in each treatment tank.

SUMMARY OF THE INVENTION

In one embodiment, the invention may provide a wastewater treatment method. The method may comprise comparing a setpoint value of ORP of a mixed liquor and a measured value of ORP of the mixed liquor, and generating a control signal based at least in part on the comparison. The method may also comprise controlling a biological nutrient removal control parameter using the control signal, acquiring at least one value corresponding to the control signal, and adjusting the setpoint value of ORP using the at least one value.

In another embodiment, the invention may provide a wastewater treatment method. The method may comprise determining a variation of a measured value of ORP from a setpoint value of ORP of a mixed liquor, and controlling operation of a device based at least in part on the determined variation. The device regulates a biological nutrient removal control parameter. The method may also comprise using data corresponding to the step of controlling a device to adjust the setpoint value of ORP so at least one operating characteristic of the device is maintained substantially within an established range of variation.

In yet another embodiment, the invention may provide a wastewater treatment method. The method may comprise mixing wastewater and activated sludge to form a mixed liquor, treating the mixed liquor under aerated-anoxic conditions, and using a control to compare a measured value of ORP and a setpoint value of ORP. The measured value of ORP may be measured using an ORP sensor. The control may generate an output corresponding to the comparison of the measured value of ORP and the setpoint value of ORP. The method may also comprise using the output to generate a control signal, and using the control signal to control operation of an oxygen supply device that regulates a supply of oxygen in the mixed liquor. The method may also comprise acquiring at least one value corresponding to at least one of the output, the control signal, the operation of the oxygen supply device, and a combination thereof, and adjusting the setpoint value of ORP when a predetermined number of values corresponding to the at least one value exceed a first threshold value in a first duration of time and when a predetermined number of values corresponding to the at least one value fail to exceed a second predetermined threshold in a second duration of time.

In yet a further embodiment, the invention may provide wastewater treatment method. The method may include establishing a setpoint value of oxidation-reduction potential of a mixed liquor, measuring a measured value of oxidation-reduction potential of the mixed liquor, comparing the measured value of oxidation-reduction potential and the setpoint value of oxidation-reduction potential, generating a control signal based at least in part on the step of comparing, controlling operation of an aeration device using the control signal, acquiring at least one value corresponding to the control signal and adjusting the setpoint value of oxidation-reduction potential using the at least one value. The value may include a frequency of operation of the aeration device.

In still a further embodiment, the invention may provide a method for wastewater treatment. The method may include establishing a setpoint value of oxidation-reduction potential of a mixed liquor, measuring a measured value of oxidation-reduction potential of the mixed liquor, comparing the measured value of oxidation-reduction potential and the setpoint value of oxidation-reduction potential, generating a control signal based at least in part on the step of comparing, controlling operation of an aeration device using the control signal and acquiring at least one value corresponding to the control signal. The value may include a frequency of operation of the aeration device. The method may also include establishing a predetermined range for frequency of operation of the aeration device. The predetermined range may have a maximum and a minimum. The method may further include determining whether the frequency of operation of the aeration device is one of a frequency included in the predetermined range, a frequency above the maximum, and a frequency below a minimum, and adjusting the setpoint value of oxidation-reduction potential using the at least one value Further aspects of the invention, together with the organization and manner of operation thereof, will become apparent from the following detailed description of the invention when taken in conjunction with the accompanying drawings wherein like elements have like numerals throughout the drawings.

BRIEF DESCRIPTION OF THE DRAWINGS

The invention is further described with reference to the accompanying drawings, which show constructions of the invention. However, it should be noted that the invention as disclosed in the accompanying drawings is illustrated by way of example only. The various elements and combinations of elements described below and illustrated in the drawings can be arranged and organized differently to result in constructions which are still within the spirit and scope of the invention. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" are used broadly and encompass both direct and indirect mountings, connections, supports, and couplings. Further, "connected" and "coupled" are not restricted to physical or mechanical connections or couplings.

DETAILED DESCRIPTION

Figure 1:
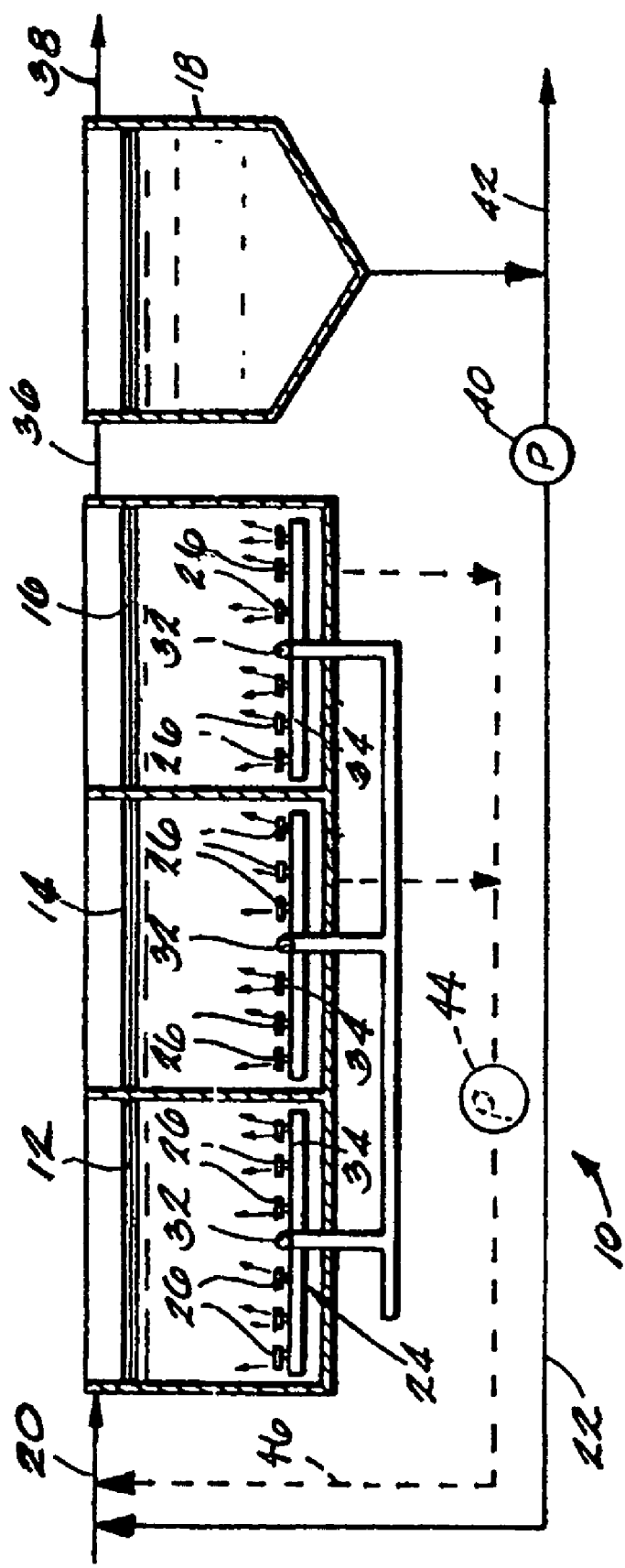
FIG. 1 is a schematic representation of an activated sludge wastewater treatment system for practicing biological nutrient removal wastewater treatment processes of the invention.

Biological Nutrient Removal (BNR) wastewater treatment processes generally comprise one or more anoxic zones for removal of nitrogen compounds, and/or one or more anaerobic zones for removal of phosphorus compounds. A number of control parameters affect the performance of a BNR wastewater treatment process. These control parameters can vary with the objectives of the wastewater treatment process and with the design configuration of the BNR wastewater treatment process.

One example of a BNR control parameter can include the supply of oxygen in the mixed liquor. Although dissolved oxygen is typically excluded in both anoxic and anaerobic zones, oxygen-carrying gas may still be supplied to the mixed liquor in these zones as long as the supply of oxygen in the mixed liquor is less than or equal to the biological oxygen demand of the mixed liquor. A negative difference between the supply of oxygen in the mixed liquor and the biological oxygen demand of the mixed liquor is commonly referred to as an oxygen deficit situation. Regulation of the oxygen deficit situation can create anaerobic and anoxic conditions for enhanced biological phosphorous removal and simultaneous nitrification and denitrification. This oxygen deficit situation is commonly referred to as an aerated-anoxic wastewater treatment process.

In an aerated-anoxic wastewater treatment process, maximum process efficiency may not be realized when the supply of oxygen in the mixed liquor is too low (e.g., the supply of oxygen in the mixed liquor is not less than or equal to the biological oxygen demand of the mixed liquor). Generally, overall costs for the wastewater treatment system increase when the process efficiency is not optimized. Similarly, the wastewater treatment process may fail when the supply of oxygen in the mixed liquor is too high (e.g., the supply of oxygen in the mixed liquor exceeds the biological oxygen demand of the mixed liquor). Process failure often provides unacceptable results (e.g., high levels of undesirable compounds in the effluent). Accordingly, regulation of the supply of oxygen in the mixed liquor may be required.

In many wastewater treatment processes, the supply of oxygen in the mixed liquor is regulated using dissolved oxygen measurements (e.g., as the dissolved oxygen concentration of the mixed liquor increases from a desired value, the supply of oxygen in the mixed liquor is decreased, and as the dissolved oxygen concentration in the mixed liquor decreases from a desired value, the supply of oxygen in the mixed liquor is increased). However, in an aerated and anoxic wastewater treatment process, the dissolved oxygen concentration in the mixed liquor is typically zero. Thus, other techniques must be utilized to regulate the supply of oxygen in the mixed liquor.

Another example of a BNR control parameter can include the feed rate of chemicals to the mixed liquor. In one instance, enhanced biological nitrogen removal processes (i.e., denitrification) require the presence of an organic carbon compound in the mixed liquor. This requirement may be provided by the wastewater and/or may require addition of a supplemental organic compound, such as methanol, to the mixed liquor. In another instance, enhanced biological phosphorus removal processes release phosphorus in an anaerobic zone while consuming low molecular weight volatile fatty acid compounds. The volatile fatty acid compounds may be derived from the wastewater and/or added to the anaerobic zone. Similar to the supply of oxygen control parameter, maximum process efficiency may not be realized when the feed rate of chemicals to the mixed liquor does not produce desired concentrations of chemical in the mixed liquor.

Another example of a BNR control parameter include internal recirculation flow rates that recycle the mixed liquor to other zones of the BNR wastewater treatment processes. The mixed liquor may be recycled in some embodiments to enhance the biological removal of nitrogen and/or phosphorus compounds. Yet other examples of BNR control parameters include the return rate of activated sludge, modulation of influent flow, and the like.

The invention provides a new strategy for regulating BNR control parameters for a wastewater treatment process that includes at least one of an anoxic zone, an anaerobic zone, and a combination thereof (e.g., an aerated-anoxic wastewater treatment process). The BNR control parameters may be regulated by controlling a setpoint value of Oxidation-Reduction Potential (ORP). ORP is a parameter that can be measured, for example, by measuring the electro-potential difference between an inert indicator electrode and a standard reference electrode. While the measurement of ORP is relatively straightforward, interpretation of the values of ORP in a wastewater treatment process may be limited by many factors. Therefore, the invention controls the setpoint of ORP using data corresponding to at least one of the BNR control parameters (e.g., variation of the data corresponding to the BNR control parameters). Such control optimizes the reliability and the efficiency of the BNR wastewater treatment process and accounts for variation in the measured value of ORP of the mixed liquor due to changing conditions in the BNR wastewater treatment process.

FIG. 1 schematically illustrates one example of a wastewater treatment system 10 for practicing activated sludge wastewater treatment processes according to the invention. The system 10 includes a first aeration zone or tank 12, a second aeration zone or tank 14, a third aeration zone or tank 16, and a settling tank or clarifier 18. A wastewater influent is introduced into the first aeration tank 12 via a conduit 20. The wastewater generally contains a combination of organic compounds, nitrogen compounds, and/or phosphorous compounds. The wastewater may be subjected to screening and/or a preliminary sedimentation treatment to remove large particulate materials prior to introduction into the first aeration tank 12. An activated sludge is introduced into the first aeration tank 12 via a conduit 22. A majority of the activated sludge is recycled from the clarifier 18. The wastewater and the recycled activated sludge are mixed (e.g., homogeneously) in the first aeration tank 12 to form a mixed liquor. Generally, the wastewater and the activated sludge are mixed by air bubbles generated when an oxygen-containing gas (e.g., air) is introduced into the first aeration tank 12 via an aeration device 24.

In the illustrated embodiment, the oxygen-containing gas establishes a supply of oxygen in the mixed liquor that is less than or equal to the biological oxygen demand of the mixed liquor. For aerated and anoxic wastewater treatment processes, a concentration of dissolved oxygen in the mixed liquor is maintained at a value as close to zero as possible.

However, because of changing conditions in the wastewater treatment processes, the concentration of dissolved oxygen in the mixed liquor may periodically fluctuate to a value slightly above zero. For example, in some embodiments, the dissolved oxygen concentration in the mixed liquor may periodically fluctuate to a value that is less than 1.0 mg/l and typically less than 0.5 mg/l. In other embodiments, the dissolved oxygen concentration in the mixed liquor may periodically fluctuate to a value higher than 1.0 mg/l.

In the illustrated embodiment, the aeration devices 24 of the system 10 each include a plurality of conventional diffusers 26 mounted to conduits 34 in a grid-like array. Oxygen-containing gas may be supplied to the diffusers 26 via the conduits 34 under pressure through a manifold 32. The oxygen-containing gas flows through a plurality of perforations in a membrane of the diffuser 26 to from a plurality of air bubbles. Air bubbles rising from the diffusers 26 serve the dual functions of providing the necessary mixing action for the mixed liquor and establishing a supply of oxygen that is less than or equal to the biological oxygen demand of the mixed liquor. In some embodiments, mechanical mixing and/or mechanical aerators may be utilized to supplement or replace the mixing provided by the aeration devices 24.

The mixed liquor flows by gravity from the first aeration tank 12 to the second aeration tank 14, and from the second aeration tank 14 to the third aeration tank 16. The environmental conditions of each of the first, second, and third aeration tanks 12, 14, and 16 are controlled to optimize the efficiency and the reliability of the overall wastewater treatment process. In the illustrated embodiment, aerated and anoxic wastewater treatment processes are carried out in each of the first aeration tank 12 and the second aeration tank 14. The mixed liquor is transferred from the third aeration tank 16 through a conduit 36 into the clarifier 18. The activated sludge settles in the clarifier 18 and a clarified effluent or supernatant is withdrawn from the upper portion of the clarifier via a conduit 38 for further treatment prior to disposal or reuse. A portion of the settled activated sludge withdrawn from the bottom portion of the clarifier 18 is recycled by a pump 40 through the conduit 22 back to the first aeration tank 12 as illustrated in FIG. 1. Another portion of the settled activated sludge is removed via a conduit 42. In some embodiments, enhanced BNR may be obtained by recycling a portion of the mixed liquor from at least one of the first aeration tank 12, the second aeration tank 14, the third aeration tank 16, and a combination thereof to an aeration tank 12, 14, and 16 other than the next aeration tank in the BNR wastewater treatment process sequence. For example, with reference to the pump 44 and the conduit 46 shown in dotted lines in FIG. 1, a portion of the mixed liquor of the second aeration tank 14 and/or the third aeration tank 16 may be recycled by the pump 44 through the conduit 46 to the first aeration tank 12.

The first, second, and third aeration tanks 12, 14 and 16, can be a single tank or basin divided into three separate zones by partitions or walls as illustrated in FIG. 1, or can be completely separate tanks or basins connected by suitable conduit means. The illustrated wastewater treatment process represents a continuous wastewater treatment process. In other embodiments, the wastewater treatment process represents a batch wastewater treatment process. It should be understood that wastewater treatment processes according to the invention may be performed in other wastewater treatment systems and the wastewater treatment system 10 is merely shown and described as one such example.

Figure 2:
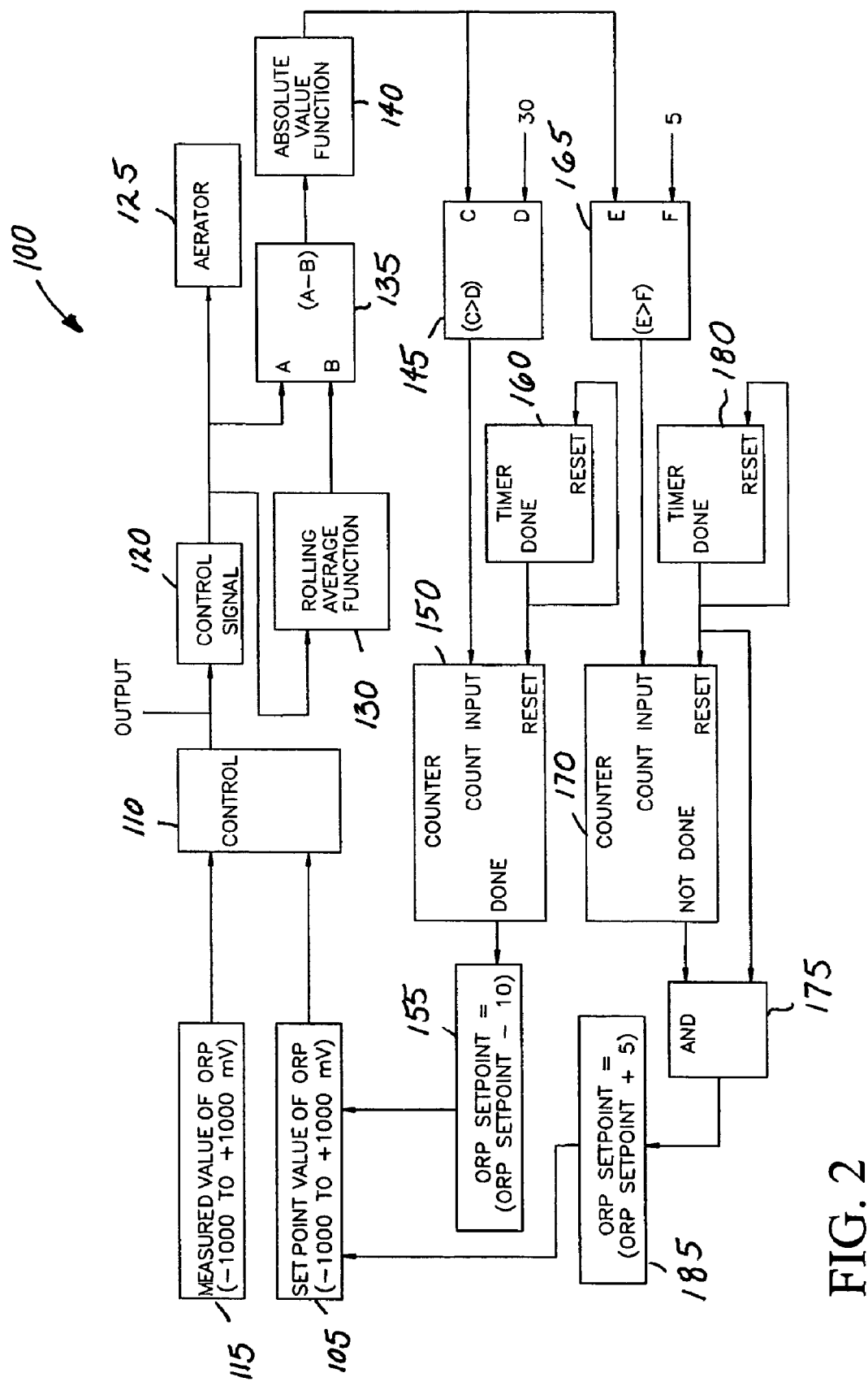
FIG. 2 is a block diagram of a wastewater treatment control according to the invention.
Figure 3:
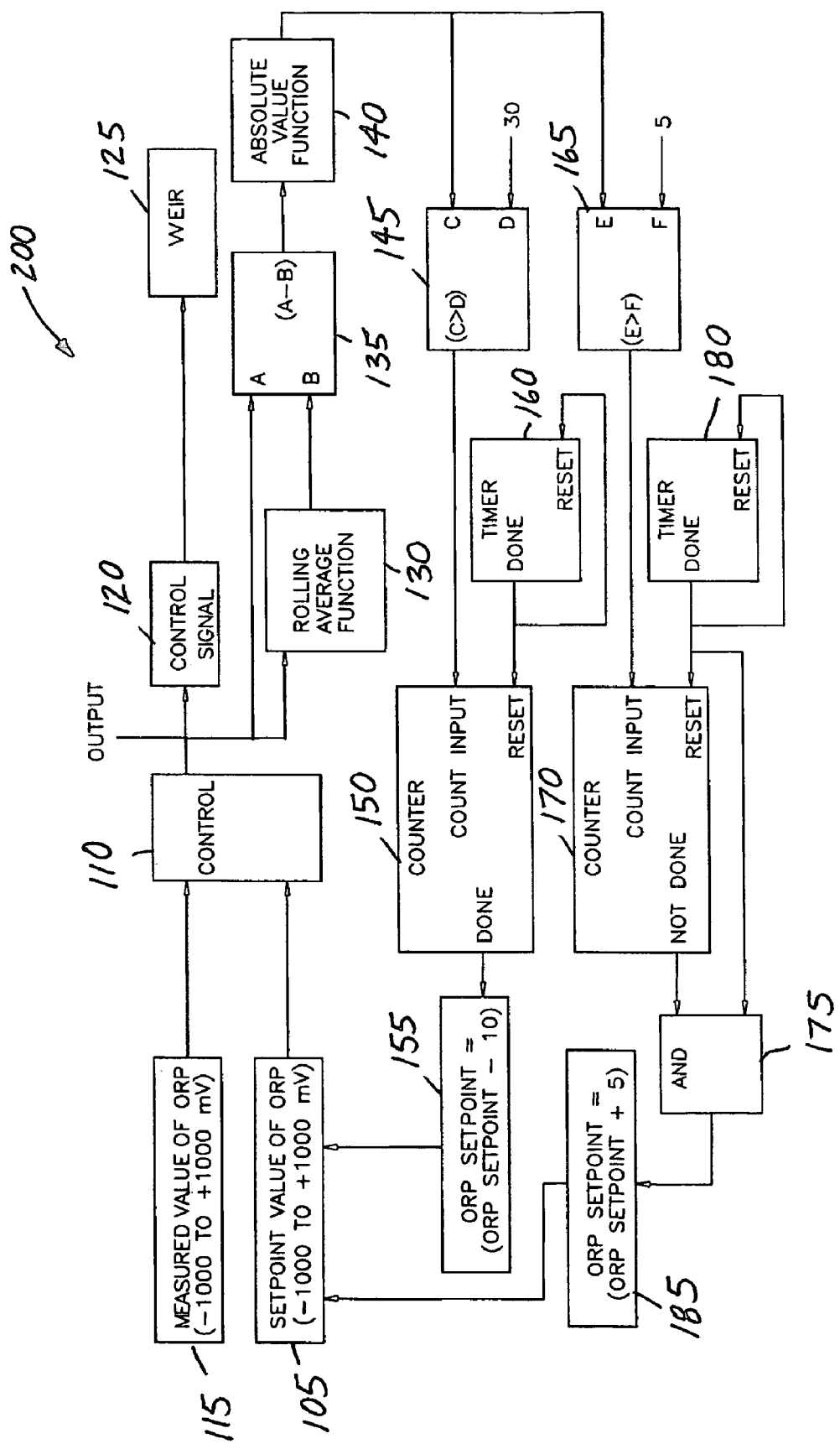
FIG. 3 is a block diagram of a wastewater treatment control according to the invention.
Figure 4:
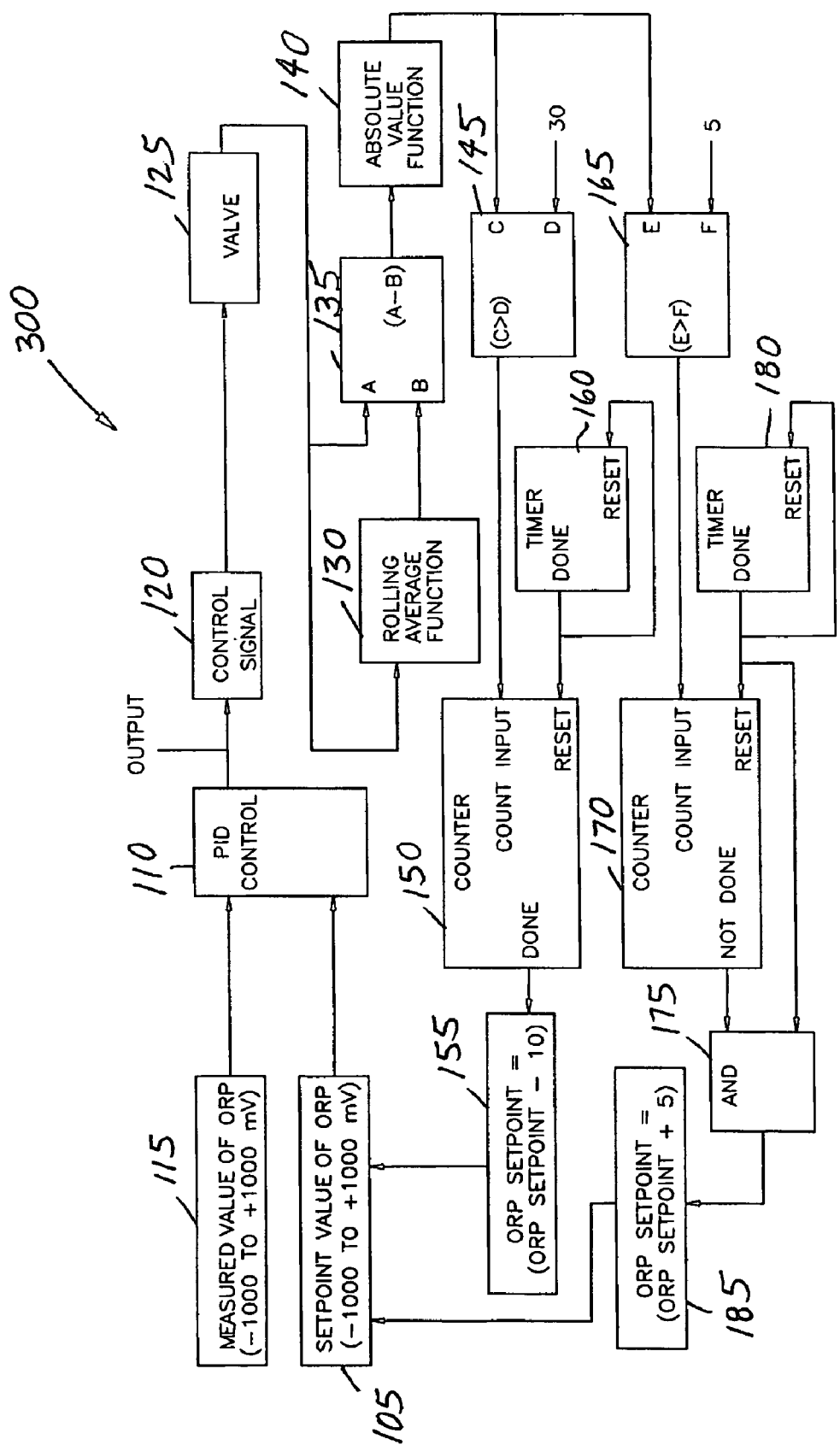
FIG. 4 is a block diagram of a wastewater treatment control according to the invention.
Figure 5:
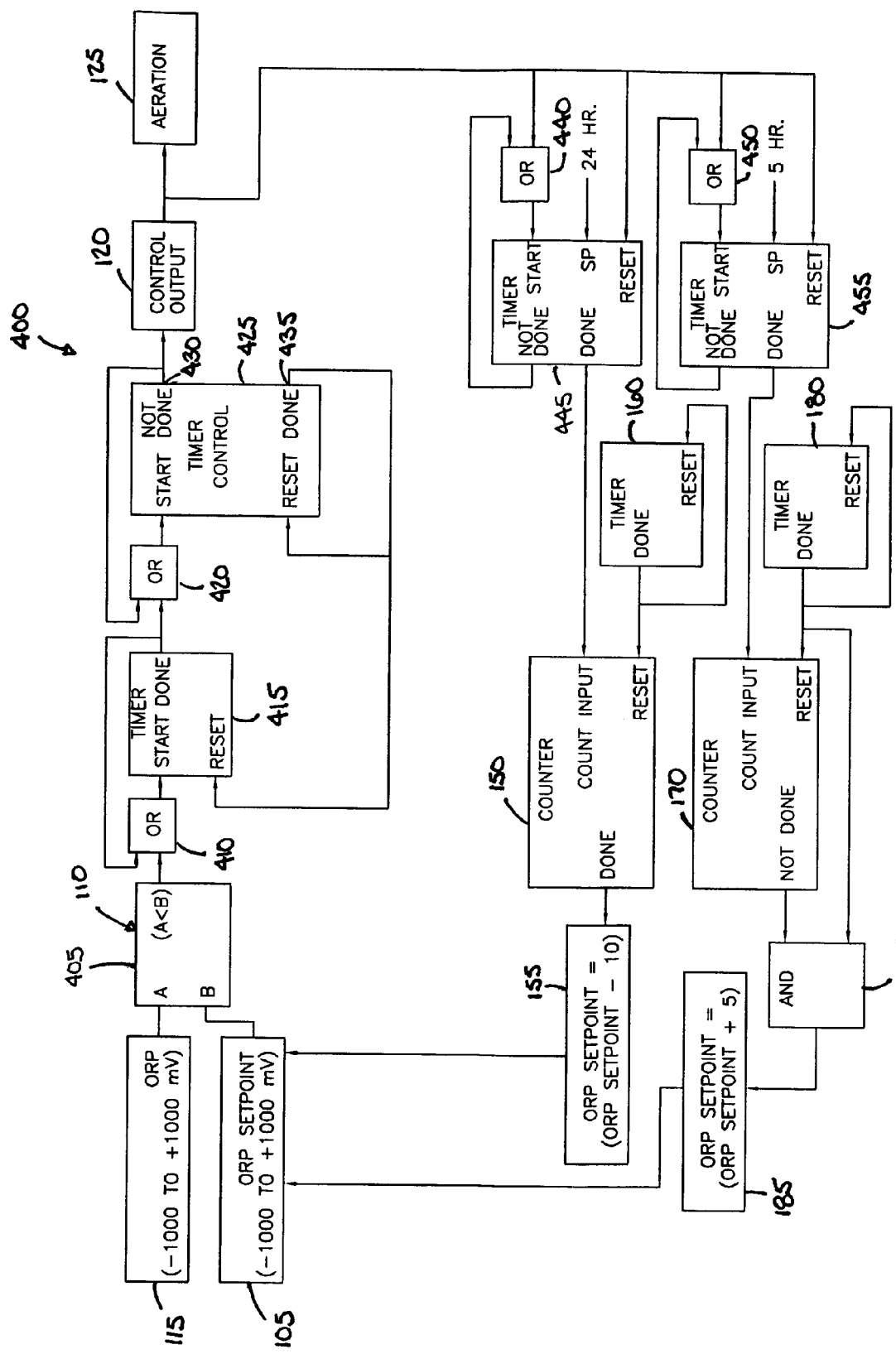
FIG. 5 is a block diagram of a wastewater treatment control according to the invention.

FIG. 2 schematically illustrates a first wastewater treatment control 100 according to the invention. FIG. 3 schematically illustrates a second wastewater treatment control 200 according to the invention. FIG. 4 schematically illustrates a third wastewater treatment control 300 according to the invention. FIG. 5 schematically illustrates a fourth wastewater treatment control 400 according to the invention. Similar components of the wastewater treatment controls 100, 200, 300 and 400 are indicated using like reference numerals in the drawings. It should be understood that aspects of the invention may be utilized in other types of wastewater treatment controls and the wastewater treatment controls 100, 200, 300 and 400 are merely shown and described as four such examples.

The wastewater treatment controls 100, 200, 300 is designed to maintain the ORP of the mixed liquor at an established setpoint value of ORP. ORP values of the mixed liquor generally tend to remain relatively stable when maximum process reliability and efficiency are obtained. Accordingly, maintenance of the ORP of the mixed liquor at the setpoint value of ORP ensures the BNR wastewater treatment process is operating reliably and efficiently. However, the ORP of the mixed liquor generally includes a time varying response to condition changes in the wastewater treatment process (e.g., a change in the volume and/or concentration of the mixed liquor, a change in wastewater treatment process operating variables (e.g., a recycle rate of activated sludge, chemical concentrations in the mixed liquor), a change in oxygen supply device operating conditions, and the like). Therefore, control parameters of the BNR wastewater treatment process must be monitored and adjusted to maintain the ORP of the mixed liquor at a relatively constant value. Further, the setpoint value of ORP may need to be adjusted if the monitored control parameters of the BNR wastewater treatment process become unstable.

An initial setpoint value of ORP 105 is established (e.g., manually established by an operator, automatically established using an algorithm) and provided as an input to a control 110. The control 110 compares the setpoint value of ORP and a measured value of ORP of the mixed liquor 115. The illustrated value of ORP 105 and 115 each include a value between −1000 millivolts and +1000 millivolts. Each measured value of ORP 115 may be obtained using any suitable means (e.g., measured using an ORP sensor). The control 110 generates an output that corresponds to the comparison of the measured value of ORP 115 and the setpoint value of ORP 105. In one embodiment, the output of the control 110 corresponds to a variation or deviation of the measured value of ORP 115 from the setpoint value of ORP 105. The variation may include at least one of the value of variation, the rate of variation, and a combination thereof. As illustrated in FIG. 4, the control 110 may include a proportional-integral-derivative (PID) control. In other embodiments, other types of controls (e.g., controls having other transfer functions) may be utilized to generate an output that corresponds to a comparison of the measured value of ORP 115 and the setpoint value of ORP 105.

A control signal 120 is generated using the output of the control 110. The relationship between the control signal 120 and the output of the control 110 may be a linear relationship or a non-linear relationship. In some embodiments, the output of the control 110 may be utilized as the control signal 120. The control signal 120 is utilized to control a BNR control parameter.

In one embodiment, the BNR control parameter includes operational characteristics of an oxygen supply device 125. The oxygen supply device 125 may include any device that is able to alter the supply of oxygen in the mixed liquor. With reference to FIG. 2, the oxygen supply device 125 may include at least one aerator. Aerators or aeration devices alter the supply of oxygen in the mixed liquor by supplying oxygen-carrying gas to the mixed liquor. With reference to FIG. 3, the oxygen supply device 125 may include at least one liquid level weir. Liquid level weirs alter the supply of oxygen in the mixed liquor by changing the oxygen delivery capability of aeration devices (e.g., by changing the immersion depth of a mechanical aeration device by increasing or decreasing the liquid level relative to the pre-existing immersion depth). With reference to FIG. 4, the oxygen supply device 125 may include at least one valve. Valves alter the supply of oxygen in the mixed liquor by regulating the flow of air into the treatment tanks. In other embodiments, operation of other types of oxygen supply devices 125 may be controlled.

Operation of an oxygen supply device 125 may be controlled in a number of ways. For example, operation of an aeration device may be controlled by at least one of controlling a position of a valve that controls the flow of oxygen-carrying gas to an aeration device, controlling a rate at which oxygen-carrying gas is provided to an aeration device (e.g., using a flow meter), controlling a sequencing process of a plurality of values that are associated with aeration devices, controlling a depth of immersion of an aeration device in the mixed liquor, and a combination thereof. Operation of an aeration device may also be controlled by at least one of controlling a speed of a motor (e.g., a variable speed motor) associated with an aeration device, controlling a staging process of a plurality of drives that are associated with aeration devices, controlling an on/off cycle of an aeration device, and a combination thereof. Operation of a liquid level weir may be controlled, for example, by at least one of controlling an actuator utilized to position the weir, controlling the rate at which the weir changes the liquid level of the mixed liquor, and a combination thereof. Operation of a valve may be controlled, for example, by at least one of controlling a position of a valve that controls the flow of influent and/or activated sludge into the treatment tanks, controlling a sequencing process of a plurality of values that are associated with the flow of influent and/or activated sludge into the treatment tanks, and a combination thereof.

Devices that control other BNR control parameters may be similarly controlled. For example, operation of a device that control the concentration of a chemical in the mixed liquor may be controlled by at least one of controlling a rate at which a chemical is provided to the mixed liquor (e.g., using a flow meter), controlling a sequencing process of a plurality of values that are associated with the flow of the chemical, and a combination thereof. Operation of a device that controls the flow of influent wastewater may be controlled by at least one of controlling a rate at which wastewater influent is provided to the mixed liquor (e.g., using a flow meter), controlling a sequencing process of a plurality of values that are associated with the flow of wastewater influent such that the wastewater is transferred to and from other locations (e.g., storage tanks) as necessary, and a combination thereof. Operation of a device that controls the recycle rate of activated sludge may be controlled by at least one of controlling a rate at which recycled sludge is provided to the mixed liquor (e.g., using a flow meter), controlling a pump motor associated with the flow of recycled sludge, and a combination thereof. Operation of a device that controls the recycle rate of mixed liquor may be controlled by at least one of controlling a rate at which mixed liquor is removed from and provided to aeration tanks (e.g., using a flow meter), controlling a sequencing process of a plurality of values that are associated with the flow of recycled mixed liquor, controlling a pump motor associated with the flow of recycled mixed liquor, and a combination thereof. It should be understood that the above is only a representative listing of some of the BNR control parameters that may be utilized with the invention.

Although the BNR control parameter may be controlled to maintain a relatively stable value of ORP of the mixed liquor, the setpoint value of ORP 105 may need to be adjusted if the BNR control parameter becomes unstable. A BNR control parameter may become unstable if the initial setpoint value of ORP 105 was incorrectly established and/or if condition changes in the wastewater treatment process require a change in the setpoint value of ORP 105. The wastewater treatment controls 100, 200, and 300 each adjust the setpoint value of ORP 105 when the frequency and/or the amplitude of a variation of values corresponding to the control signal 120 falls outside of a predefined range. In the illustrated embodiment, the predefined range establishes both maximum and minimum levels of variation. In other embodiments, other mathematical solutions (e.g., standard deviation functions, Fast Fourier Transforms, and the like) may be utilized to adjust the setpoint value of ORP 105 using the values corresponding to the control signal 120.

Values corresponding to the control signal 120 are obtained and utilized to adjust the setpoint value of ORP 105. With reference to FIG. 2, the values corresponding to the control signal 120 include values corresponding to the control signal 120. With reference to FIG. 3, the values corresponding to the control signal 120 include values corresponding to the output of the control 110. With reference to FIG. 4, the values corresponding to the control signal 120 include values corresponding to the BNR control parameter (e.g., operational characteristics of a device that regulates a BNR control parameter, the operational characteristics including, for example, a speed of a motor, a position of a valve, a depth of immersion, a flow rate, a recycle rate, a concentration, a volume, and the like).

With reference to FIGS. 2-4, the values corresponding to the control signal 120 are provided as inputs to a rolling average function 130. The rolling average function 130 determines a rolling average value of the already sampled values corresponding to the control signal 120. A first comparator 135 receives an input A representative of the current value corresponding to the control signal 120 and an input B representative of the current rolling average value. The first comparator 135 generates an output representative of the difference between the value of the input A and the value of the input B. The output generated by the first comparator 135 is provided as an input to an absolute value function 140. The absolute value function 140 determines an absolute value of variation (i.e., the absolute value of the difference between the value of the input A and the value of the input B).

A second comparator 145 receives an input C representative of the absolute value of variation and an input D representative of a first threshold value (e.g., thirty millivolts). The second comparator 145 generates a first trigger output when the value of the input C is greater than the value of the input D.

The first trigger output is utilized to increment a first counter 150. The first counter 150 is incremented until a first counter threshold is reached. If the first threshold level is reached prior to a first timer 160 resetting the first counter 150, the first counter 150 generates an output which is utilized to initialize an ORP setpoint adjustment value 155. In the illustrated embodiment, the first timer 160 generates a first timer output which resets the first counter 150 when a first time duration is met so that if the BNR control parameter is not sufficiently unstable, no action is taken due to the first counter 150. The first timer output is also utilized to reset the first timer 160. The illustrated ORP setpoint adjustment value 155 adjusts the setpoint value of ORP 105 by lowering the setpoint value of ORP 105 by, for example, ten millivolts. In other embodiments, the ORP setpoint adjustment value 155 may alternatively adjust the setpoint value of ORP 105.

A third comparator 165 receives an input E representative of the absolute value of variation and an input F representative of a second threshold value (e.g., five millivolts). In the illustrated embodiment, the second threshold value is less than the first threshold value. The first threshold value establishes the maximum level of variation and the second threshold value establishes the minimum level of variation. In other embodiments, the thresholds may be alternatively established. The third comparator 165 generates a second trigger output when the value of the input E is greater than the value of the input F.

The second trigger output is utilized to increment a second counter 170. The second counter 170 is incremented until a second counter threshold is reached. If the second threshold level is reached prior to a second timer 180 resetting the second counter 170, the logic high output which is normally provided to an AND gate 175 is changed to a logic low output. In the illustrated embodiment, the second timer 180 generates a second timer output which resets the second counter 170 when a second time duration is met so that if the BNR control parameter is sufficiently unstable, an action is not taken due to the second counter 180.

The illustrated second timer 180 generates a second timer output which resets the second counter 170 when the second time duration is met. The second timer output is also utilized to reset the second timer 180 and to generate an AND output at the AND gate 175 if the counter 170 is providing a logic high output (i.e., the second counter threshold has not been reached). The AND output is utilized to initialize an ORP setpoint adjustment value 185. The illustrated ORP setpoint adjustment value 185 adjusts the setpoint value of ORP 105 by raising the setpoint value of ORP 105 by, for example, five millivolts. In other embodiments, the ORP setpoint adjustment value 185 may alternatively adjust the setpoint value of ORP 105.

FIG. 5 schematically illustrates a fourth wastewater treatment control 400 according to the invention. As shown in FIG. 5, the fourth wastewater treatment control 400 includes similar components as the first, second and third wastewater treatment control 100, 200 and 300, such as, for example, the initial setpoint value of ORP 105, the control 110, the measured value of ORP 115, the control output 120, the oxygen supply device 125 (e.g., an aerator), a first counter 150, a first ORP setpoint adjustment value 155, a first timer 160, a second counter 170, an AND gate 175, a second timer 180 and a second ORP setpoint adjustment value 185. The wastewater treatment control 400 illustrated in FIG. 5 can adjust the ORP setpoint value based at least in part on the fluctuation of the control signal 120. This control 400 can be used to optimize operation of mixers and aeration devices in the sludge or solids reduction process of wastewater treatment.

The solids reduction process including adding air at various times to maintain a particular process. The frequency of adding air can be determined based on the ORP of the process. If the setpoint value of ORP 105 used to determine when to add air is too high, the frequency of operation of the aeration device (e.g., frequency of adding air to the process) could be less often. If the setpoint value of ORP 105 used to determine when to add air is too low, the frequency of operation of the aeration device could be more often. If the amount of time is consistently short between air cycles (as determined by the control 400), the setpoint value of ORP 105 can be adjusted. Likewise, if the amount of time is consistently long between air cycles (as determined also by the control 400), the setpoint value of ORP 105 can be adjusted accordingly.

As illustrated in FIG. 5, the initial setpoint value of ORP 105 is provided as an input to the control 110. In this embodiment, the control 110 is a comparator 405 (referred to herein as the ORP setpoint comparator 405) comparing the setpoint value of ORP 105 and the measured value of ORP 115. The ORP setpoint comparator 405 generates an output that corresponds to the comparison of the measure value of ORP 115 and the setpoint value of ORP 105. In this embodiment, the output of the comparator 405 corresponds to whether the measured value of ORP 115 is less than the setpoint value of ORP 105. For example, in this embodiment, the comparator 405 provides a logic high output when the measured value of ORP 115 is less than the setpoint value of ORP 105.

When the measured value of ORP 115 is less than the setpoint value of ORP 105, the output of the ORP setpoint comparator 405 is provided to a first OR gate 410. This logic high input provided to the OR gate 410 triggers a third timer 415. The output of the third timer 415 is fed to both the first OR gate 410 and a second OR gate 420. When the third timer 415 expires, the timer 415 sends a logic high output to the second OR gate 420. The second OR gate 420 in turn sends a signal to initiate a timer control 425.

The timer control 425 includes a first output 430 and a second output 435. The first output 430 is a logic high output when the timer control 425 has been initiated and the time has not expired. The first output 430 is provided as an input to the second OR gate 420 and to the control output 120. The second output 435 is a logic high output when the timer control 425 has been initiated and the time has expired. The second output 435 is used to reset both the initial timer 415 and the timer control 425. In the illustrated embodiment, the third timer 415, the timer control 425 and the control output 120 determine, at least in part, the frequency at which the air supply device 125 adds air to the process.

As mentioned previously, the setpoint value of ORP 105 may need to be adjust if the frequency or fluctuation of the control signal 120 (e.g., the signal controlling the air supply device 125) is not within a predefined range. In the illustrated embodiment, the predefined range establishes both a maximum and minimum. For example, if the setpoint value of ORP 105 used to determine when to add air is too high, the process may not be enough adding air to the process as determined by a maximum time limit, such as, 24 hours. If the setpoint value of ORP 105 used to determine when to add air is too low, the process may be adding air too often as determine by the minimum time limit, such as, 5 hours.

As shown in FIG. 5, a fourth timer 445 and a fifth timer 455 establish the maximum and minimum time limits for the control 400. If the timers 445, 455 are not reset prior to the respective time limits expiring, the timers 445, 455 would trigger the counters 150 and 170 to increment, respectively. As mentioned previously, if the counters 150, 170 reach their respective counter thresholds prior to the timers 160, 180 resetting the counters 150, 170, the counters 150, 170 generate outputs which would be used to initialize ORP setpoint adjustment values 155, 185, respectively.

The control signal 120 is used as an input for a third OR gate 440 used to trigger the fourth timer 445. The control signal 120 is also used as an input for a fourth OR gate 450 used to trigger the fifth timer 455. In this embodiment, the control output 120 is further used to reset the fourth and fifth timers 445, 455.

The circuitry of the wastewater treatment controls 100, 200, 300 and 400 may be implemented via software, hardware, or a combination thereof.

The embodiments described above and illustrated in the figures are presented by way of example only and are not intended as a limitation upon the concepts and principles of the invention. As such, it will be appreciated by one having ordinary skill in the art that various changes in the elements and their configuration and arrangement are possible without departing from the spirit and scope of the invention as set forth in the appended claims. The claimed steps in the claimed methods need not be performed in the order listed, unless specifically stated so.

What is claimed is:

1. A wastewater treatment method comprising:
   establishing a setpoint value of oxidation-reduction potential of a mixed liquor;
   measuring a measured value of oxidation-reduction potential of the mixed liquor;
   comparing the measured value of oxidation-reduction potential and the setpoint value of oxidation-reduction potential;
   generating a control signal based at least in part on the step of comparing;
   controlling operation of an aeration device using the control signal;
   acquiring at least one value corresponding to the control signal, the at least one value including a frequency of operation of the aeration device; and
   adjusting the setpoint value of oxidation-reduction potential using the at least one value.

2. A method according to claim 1, wherein the mixed liquor is formed by mixing wastewater and activated sludge, and further comprising treating the mixed liquor under at least one of an anoxic condition, an anaerobic condition, and a combination thereof.

3. A method according to claim 1, wherein the wastewater treatment method comprises a solids reduction process.

4. A method according to claim 3, wherein the solids reduction process includes a continuous flow sludge interchange process.

5. A method according to claim 3, wherein the solids reduction process includes a batch sludge interchange process.

6. A method according to claim 1, and further comprising,
   establishing a maximum frequency of operation of the aeration device;
   establishing a minimum frequency of operation of the aeration device;
   determining whether the frequency of operation of the aeration device is greater than the maximum frequency of operation of the aeration device; and
   determining whether the frequency of operation of the aeration device is less than the minimum frequency of operation of the aeration device.

7. A method according to claim 6, wherein adjusting the setpoint value of oxidation-reduction potential using the at least one value includes deceasing the setpoint value of oxidation-reduction potential if the frequency of operation is a frequency above the maximum frequency of operation.

8. A method as set forth in claim 7, wherein adjusting the setpoint value of oxidation-reduction potential using the at least one value includes increasing the setpoint value of oxidation-reduction potential if the frequency of operation is a frequency below the minimum frequency of operation.

9. A method as set forth in claim 6, further comprising maintaining the setpoint value of oxidation-reduction potential if the frequency of operation of the aeration device is less that the maximum frequency of operation of the aeration device and greater than the minimum frequency of operation of the aeration device.

10. A method as set forth in claim 1, wherein adjusting the setpoint value of oxidation-reduction potential includes adjusting the setpoint value of oxidation-reduction potential if the frequency of operation is one of a frequency above a maximum or a frequency below a minimum.

11. A method for wastewater treatment, the method comprising,
    establishing a setpoint value of oxidation-reduction potential of a mixed liquor;
    measuring a measured value of oxidation-reduction potential of the mixed liquor;
    comparing the measured value of oxidation-reduction potential and the setpoint value of oxidation-reduction potential;
    generating a control signal based at least in part on the step of comparing;
    controlling operation of an aeration device using the control signal;
    acquiring at least one value corresponding to the control signal, the at least one value including a frequency of operation of the aeration device;
    establishing a predetermined range for frequency of operation of the aeration device, the predetermined range having a maximum and a minimum,
    determining whether the frequency of operation of the aeration device is one of a frequency included in the predetermined range, a frequency above the maximum, and a frequency below a minimum, and
    adjusting the setpoint value of oxidation-reduction potential using the at least one value.

12. A method as set forth in claim 11, wherein adjusting the setpoint value of oxidation-reduction potential includes adjusting the setpoint value of oxidation-reduction potential if the frequency of operation is one of a frequency above the maximum or a frequency below the minimum.

13. A method as set forth in claim 12, wherein adjusting the set point value of oxidation-reduction potential further includes increasing the setpoint value of oxidation-reduction potential if the frequency of operation is a frequency below the minimum.

14. A method as set forth in claim 12, wherein adjusting the setpoint value of oxidation-reduction potential further includes decreasing the setpoint value of oxidation-reduction potential if the frequency of operation is a frequency above the maximum.

15. A method as set forth in claim 11, further comprising maintaining the setpoint value of oxidation-reduction potential if the frequency of operation of the aeration device is a frequency included in the predetermined range.

* * * * *